United States Patent [19]
Broman

[11] Patent Number: 4,906,039
[45] Date of Patent: Mar. 6, 1990

[54] EQUIPMENT CARRIER FOR TURF MAINTENANCE VEHICLE

[75] Inventor: Donald E. Broman, Lincoln, Nebr.

[73] Assignee: Cushman, Inc., Lincoln, Nebr.

[21] Appl. No.: 263,278

[22] Filed: Oct. 27, 1988

[51] Int. Cl.[4] .............................................. B60R 9/06
[52] U.S. Cl. ................................ 296/37.6; 280/769; 414/462
[58] Field of Search ............................ 296/37.1, 37.6; 414/462 X; 280/769 X

[56] References Cited

U.S. PATENT DOCUMENTS

| | | | |
|---|---|---|---|
| 1,188,932 | 6/1916 | Griffith | 414/534 |
| 1,792,586 | 2/1931 | Heggins | 280/769 |
| 2,274,487 | 2/1942 | Krenzke | 180/16 |
| 2,290,737 | 7/1942 | Chadwick, Jr. | 214/140 |
| 2,338,955 | 1/1944 | Metcalf | 280/769 |
| 2,593,796 | 4/1952 | Riewerts | 280/769 |
| 2,930,500 | 3/1960 | Ellis | 214/77 |
| 2,966,275 | 12/1960 | Brookins | 214/462 |
| 4,268,209 | 5/1981 | Westerman | 414/462 |
| 4,744,590 | 5/1988 | Chesney | 296/37.1 |

Primary Examiner—Robert R. Song
Attorney, Agent, or Firm—Welsh & Katz, Ltd.

[57] ABSTRACT

An equipment carrier for a vehicle having a dump box and a tailgate framed by a pair of vertical stake pockets includes a carrier portion with a generally L-shaped cross section including a vertical rear wall joined to a horizontal floor, the rear wall having side edges framed by vertically projecting supports, each support having a laterally projecting pivot pin, and a bumper member secured to the back wall to separate the carrier portion from the tailgate of the vehicle, the carrier also including a pivot bracket portion having a pair of L-shaped pivot members, each member having a leg portion adapted to be inserted into one of the stake pockets, and a rearwardly extending portion having a slot adapted to pivotally retain one of the pivot pins of the carrier portion therein, and further having a keeper pin for retaining the pivot pins within the slots. As the dump box of the vehicle is raised, the carrier portion is lowered so that the floor rests on the ground. In this position, walk-behind turf equipment may be loaded upon the carrier. When transport is desired, the dump box is lowered, elevating the carrier portion.

15 Claims, 2 Drawing Sheets

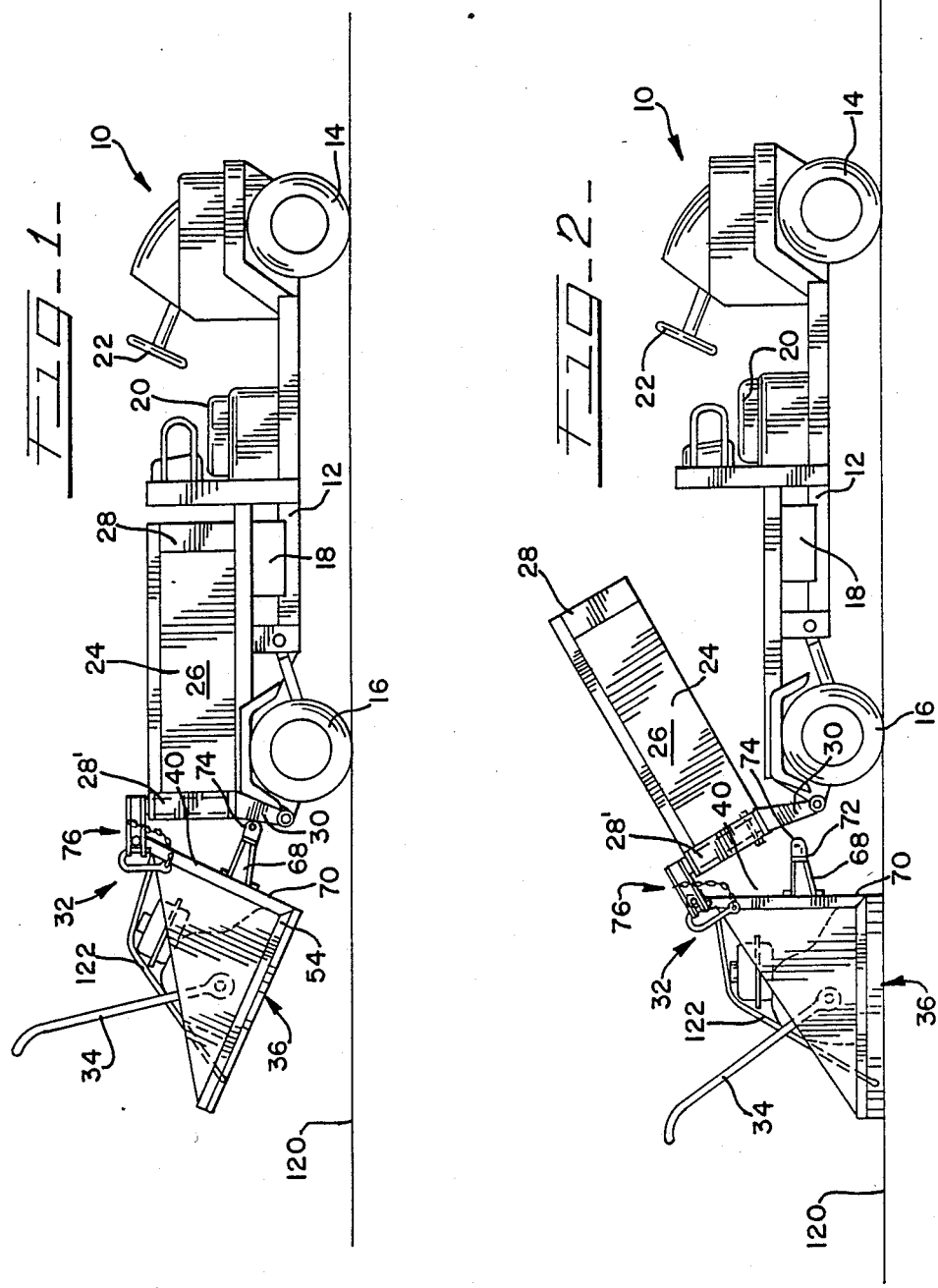

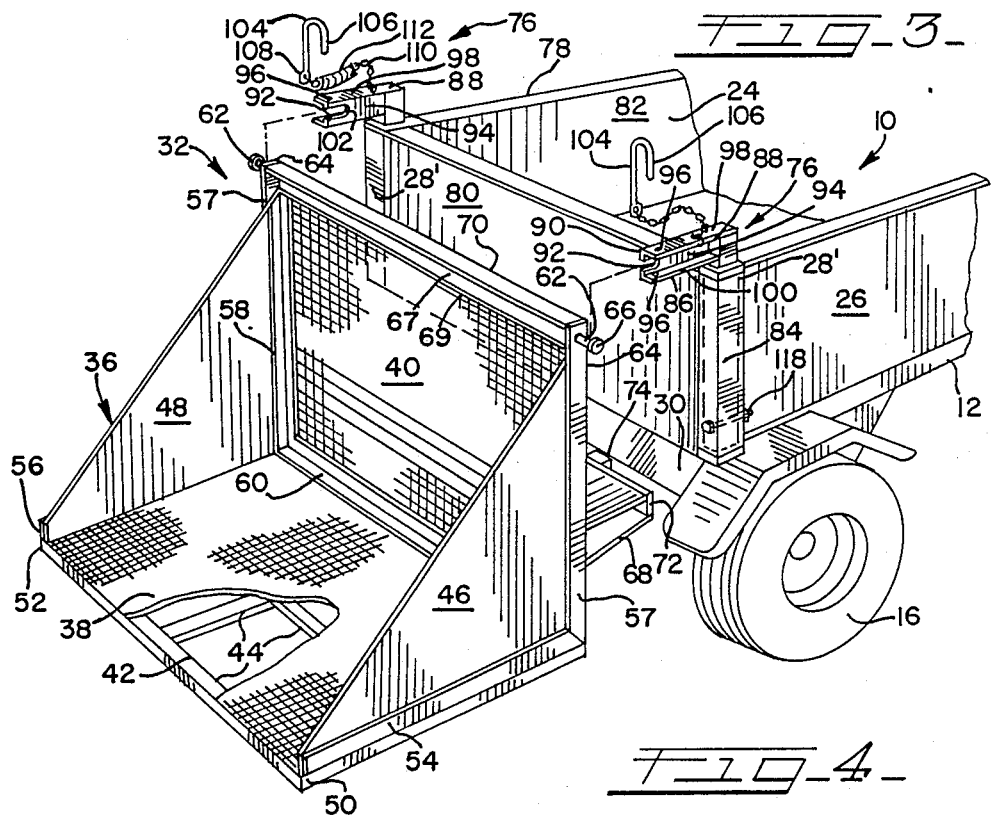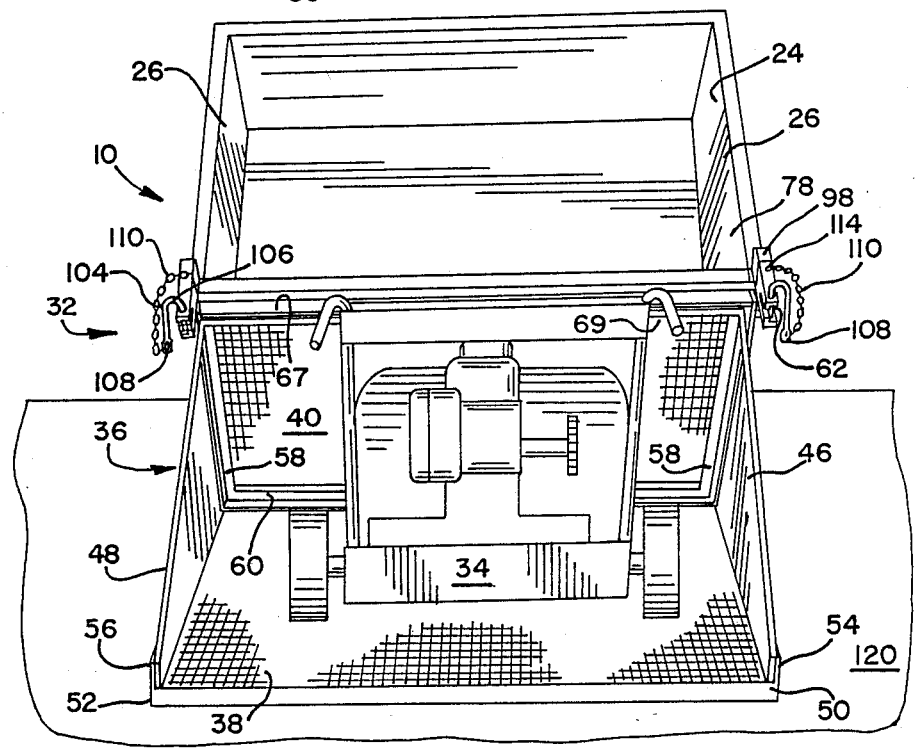

EQUIPMENT CARRIER FOR TURF MAINTENANCE VEHICLE

BACKGROUND OF THE INVENTION

The present invention relates to devices for transporting relatively heavy pieces of equipment upon vehicles, and specifically relates to a detachable carrier for the transport of turf maintenance equipment by a dump-style self-propelled turf maintenance vehicle.

Various configurations of lightweight, compact, self-propelled maintenance vehicles are popular for use in the maintenance of large turf areas, such as golf courses and parks. Such vehicles are normally provided with a rear cargo box used to retain equipment and supplies, such as soil, seed, tools, etc., for transport from one area of the facility to another, and may be further provided with attachments which enable the vehicle to perform other tasks such as spraying, mulching, core harvesting, etc. In some cases, the cargo box may be elevated at a forward end to allow the dumping of its contents One such vehicle is sold by the Outboard Marine Corporation, Waukegan, Ill., under its TURF TRUCKSTER trademark.

It has heretofore been cumbersome, inconvenient and even hazardous to attempt to use these compact turf maintenance vehicles for the transport of heavier, walk-behind turf maintenance equipment such as mowers, power rakes, etc. Due to its weight and size, this type of equipment is cumbersome to load into the box of the vehicle. Conventional apparatus used to accomplish the loading of such walk-behind equipment includes the use of separate loading ramps, the unfolding of the vehicle tailgate to act as a loading ramp, or the manual lifting of the equipment into the dump box. The loading and unloading of such heavy equipment in this manner is time consuming and creates a great potential for injury to maintenance personnel. Also, the use of trailers in such situations is impractical due to cost considerations.

Thus, there is a need for a carrier apparatus which may be releasably secured to a lightweight turf maintenance vehicle and which enables the vehicle to transport relatively heavy turf maintenance equipment. Such an apparatus should be readily removed from the vehicle so that the vehicle may be used for other tasks as described above. In addition, the carrier apparatus should be adapted so that turf equipment may be easily and safely loaded and unloaded therefrom at ground level without exertion by turf maintenance personnel. The carrier should preferably be inexpensive to manufacture and easily adaptable to a variety of maintenance vehicle configurations.

SUMMARY OF THE INVENTION

Accordingly, an equipment carrier is provided for a vehicle having a dump box with rear stake pockets. The present carrier includes a carrier portion having a generally L-shaped configuration with a horizontal floor which rests upon or close to the ground or turf surface, and a vertical rear wall. The rear wall is provided with a vertically projecting support member along each side margin thereof, and each such support member is provided with a laterally projecting pivot pin. The rear wall may be further provided on a front face thereof with a bumper member which maintains the spaced relation between the carrier and the vehicle, especially when the vehicle is in motion. The present carrier also includes a pivot bracket portion including pivot brackets designed to be inserted into the vertically projecting stake pockets commonly found adjacent the tailgate of such vehicles. The pivot brackets are further provided with rearwardly extending channel portions, each having a slot adapted to accommodate the pivot pins of the carrier portion. Keeper pins are provided to retain the pivot pins within the slots and thus maintain the carrier portion in a secure, pivoting relationship with the dump box.

The carrier portion is coupled to the vehicle by means of the pivot brackets while the dump box is in the dump position. In this position, the floor of the carrier portion rests upon the ground, and equipment may be readily loaded or unloaded upon the carrier portion from the turf surface. When transport is desired, the dump box is lowered to its transport position and the equipment carrier is elevated above the turf surface. The bumper maintains the position of the carrier portion relative to the rear of the vehicle and prevents damage to the vehicle, the carrier portion and to the equipment transported thereby.

The advantages of the present invention include that items may be carried in the dump box while equipment is stored in the carrier, the detachability of the carrier frees the vehicle for other maintenance tasks, and structural modification of the vehicle is not required for mounting the carrier thereto.

BRIEF DESCRIPTION OF THE DRAWINGS

FIG. 1 is a side elevation of a turf maintenance vehicle incorporating the carrier of the invention in the transport position;

FIG. 2 is a side elevational view of the vehicle and carrier as depicted in FIG. 1 shown in the load/unload position;

FIG. 3 is a rear perspective elevational view showing the carrier portion and the mounting of the pivot brackets to the vehicle, with portions cut away for clarity; and FIG. 4 is a rear perspective elevational view of the carrier shown in the load/unload position with turf maintenance equipment loaded thereon.

DESCRIPTION OF THE PREFERRED EMBODIMENT

Referring now to the drawings, wherein identical reference numerals indicate identical characteristics, FIG. 1 illustrates a turf maintenance vehicle designated generally 10 which includes a frame 12 to which pairs of front and rear wheels 14 and 16, respectively, are secured. The vehicle 10 is powered by a drive source 18 which may be an internal combustion engine or an electric motor. An operator's seat 20 and a steering wheel 22 are also provided. The drive source 18 may be located beneath the seat 20 if desired. In addition, the vehicle 10 is preferably equipped with a rear dump box 24. The dump box 24 is provided along each sidewall 26 thereof with at least one vertically projecting tubular stake pocket 28. A rear pivot support 30 which is powered by conventional hydraulic circuitry (not shown) and controlled by the operator secures the dump box 24 to the frame 12.

The dump box 24 is operable between a transport position wherein the dump box 24 is in a lowered orientation, and a load/unload or dump position (best seen in FIG. 2) in which a front end of the dump box 24 is elevated to allow the dumping of contents therefrom.

Such a vehicle 10 is manufactured by Outboard Marine Corporation, Waukegan, Ill., the assignee of record, and sold under the trademark "TURF TRUCKSTER". The equipment carrier of the invention, generally designated 32, is shown with a piece of walk-behind turf maintenance equipment such as a greens mower 34 retained therein.

Referring now to FIG. 3, and to a lesser extent, FIGS. 1, 2 and 4, the carrier 32 includes a carrier portion 36 which is generally L-shaped in cross section and includes a floor or load bed 38 and a vertically projecting rear wall 40. The floor 38 and rear wall 40 are preferably manufactured of sturdy grades of expanded metal, however, any sort of rigid, durable material may be used. The floor 38 is supported by a frame 42 which is preferably fabricated of hollow channel members 44 for strength as well as light weight.

The carrier portion 36 is preferably provided with a pair of triangular shaped lateral sidewalls 46 and 48 for structural rigidity of the carrier as well as for the retention of transported articles. The sidewalls 46, 48 are each joined to the floor 38 and the rear wall 40 along respective side edge margins 50 and 52 thereof. A pair of L-shaped support members 54 and 56 are provided, each having a vertical leg 57, and are secured to the respective side margins 50 and 52 to provide structural support for the carrier portion 36. The vertical legs 57 are integrally joined to the rear wall 40 along the respective side edges 50 and 52. The carrier portion 36 is provided with additional support by a pair of vertical angle members 58 which secure the sidewalls 46 and 48 to the rear wall 40, as well as by a horizontal angle member 60 which supports the attachment point of the rear wall 40 along its lower margin to the floor 38 at its back end. In the preferred embodiment, the angle members 58 are joined, as by welding, to the member 60.

A pivot pin 62 is secured to an upper end 64 of each of the vertically projecting legs 57 of the support members 54 and 56. The pivot pin 62 preferably is provided with a large head 66 and is fixed to the support members 54 and 56 so as to be in laterally projecting perpendicular relationship thereto. Although the pins 62 are depicted as projecting outwardly from the side edges 50, 52 of the carrier portion 36, they may also be designed to project inwardly, i.e., on the opposite side of the support members 54, 56. In the preferred embodiment, the pins 62 are large-headed rivets, and are welded to each of the respective support members 54, 56. Structural support for the pins 62 may be provided by an elongate angle member 67 which is horizontally disposed between the upper ends 64 of the legs 57. The member 67 is fixed at each of its ends to a respective upper end 64, as well as to an upper edge 69 of the rear wall 40.

A bumper mounting panel 68 is mounted to the rear wall 40 along its front side face 70 (best seen in FIGS. 1 and 2) which is directly opposite the rear of the vehicle 10. The bumper mounting panel 68 is preferably a single piece of sheet stock which is formed into the configuration as depicted to provide a forwardly projecting support face 72 upon which is mounted at least one and preferably two resilient bumper pads 74. The bumper mounting panel 68 is positioned on the rear wall 40 so as to engage the dump box pivot support 30 when the carrier 32 is in its transport position (best seen in FIG. 1).

A pair of carrier pivot brackets 76 are provided to enable the attachment of the carrier portion 36 to a rear portion 78 of the dump box 24, which includes a tailgate 80 framed by the rear stake pockets 28' mounted on the sidewalls 26 of the dump box 24. Each bracket 76 is provided in a substantially L-shaped configuration with an elongate, vertically depending leg portion 84 dimensioned to be inserted into one of the stake pockets 28'. The carrier pivot bracket 76 is further provided with a rearwardly projecting portion 86 fabricated of a channel type construction having a C-shaped cross section. The rear portion 86 is provided with a front end 88 attached to the leg portion 84, and a rear end 90 having a rear opening slot 92 in a vertical wall 94 thereof. The rear projecting portion 86 is further provided with a pair of axially aligned opening 96 in top and bottom wall surfaces 98 and 100, respectively. The openings 96 should be positioned upon the upper and lower walls 98 and 100 rearwardly of a closed end 102 of the slot 92.

Each carrier pivot bracket 76 is provided with a respective keeper pin 104 having a hook end 106 and an eyelet end 108. The keeper pins 104 are secured at their eyelet ends 108 to the carrier pivot bracket 76 by a flexible fastening device 110, preferably a sturdy link chain. If desired, to avoid unnecessary damage to the carrier 32 or the dump box 24, the chains 110 may be provided with plastic sheathing 112 (best seen in FIG. 3). The chains 110 are secured to the carrier pivot brackets 76 at an opening 114 (best seen in FIG. 4) in the top wall 98 of the rear projecting portion 86. Each keeper pin 104 is designed to retain the respective pivot pin 62 against the closed end 102 of the slot 92.

If desired, the leg portions 84 of the carrier pivot brackets 76 may be secured within the stake pockets 28' by a threaded fastener such as a bolt 118 which is passed through appropriate openings in the pocket 28', as well as through the leg portion 84.

In operation, an individual maintenance worker may insert the leg portions 84 of the brackets 76 into the stake pockets 28' by hand and secure the retaining bolts 118. The vehicle 10 is then positioned so that the carrier portion 36, resting on the ground or turf surface 120, is directly behind the tailgate 80, with the pivot pins 62 being closely adjacent the respective slots 92. The dump box 24 is then raised to its load/unload position (best seen in FIGS. 2 and 4). In this position, and referring now to FIGS. 3 and 4, the pivot pins 62 are inserted into the slots 92 and retained therein by the keeper pins 104. To this end, the hook ends 106 of the keeper pins 104 are inserted into the upper and lower axial openings 96 of each rear projecting portion 86.

In the load/unload position, a piece of walk-behind turf maintenance equipment such as a greens mower 34 is easily rolled upon the floor 38 of the carrier portion 36. Loading is made easy because the floor 38 is closely adjacent the ground 120. Thus, a ramp is unnecessary. The mower 34 may be secured upon the floor 38 and within the carrier portion 36 by means of a conventional hook-ended rubber cord 122 (best seen in FIGS. 1 and 2).

When the mower 34 has been secured to the carrier 32, and transport thereof is desired, the operator lowers the dump box 24 to the transport position as shown in FIG. 1. As the dump box 24 is lowered, the bumper pads 74 will contact the lower pivot portion 30 of the dump box. In this position, the configuration of the bumper mounting panel 68 provides that the floor 38 of the carrier portion 36 will be angled slightly upward so as to prevent movement of the mower 34 or other transported articles within the carrier portion.

Thus, the present invention enables a single maintenance worker to load or unload heavy equipment onto the vehicle 10 for transport from one site to another without risk of fatigue or injury, or damage to the equipment. In addition, the carrier of the invention allows the dump box to remain available for the transport of other articles.

While certain embodiments of the equipment carrier of the invention have been shown and described, it will be appreciated by those skilled in the art that deviations from the disclosed embodiments may be shown without departing from the invention in its broader aspects and as set forth in the following claims.

I claim:

1. An equipment carrier for a vehicle having a dump box with a tailgate framed by a pair of vertical stake pockets, comprising:
    a carrier portion having a generally L-shaped cross section with a vertical rear wall having an upper end and a horizontal floor, said rear wall and said floor being joined to each other, and each having side edge margins, the upper end of said rear wall having a pair of laterally spaced pivot means defining a common pivot axis; and
    a pivot bracket portion having a pair of pivot brackets, each said bracket having a first vertically depending portion adapted to be inserted into one of said stake pockets, a second portion having attachment means adapted to accommodate one of said pivot means of said carrier portion for pivoting movement therein, and means for retaining said pivot means relative to said bracket portion.

2. The equipment carrier as defined in claim 1 wherein said carrier portion is provided with bumper means situated on a side face of said rear wall so as to engage a rear portion of said vehicle and to maintain the carrier portion and the vehicle in spaced relation to each other.

3. The equipment carrier as defined in claim 2 wherein said bumper means includes a bumper mounting panel secured to said wall and having at least one resilient bumper pad mounted thereto.

4. The equipment carrier as defined in claim 1 wherein said carrier portion is provided with a pair of sidewalls, each of said sidewalls being positioned along said respective side margins of said back wall and said floor.

5. The equipment carrier as defined in claim 1 wherein said attachment means is a slot in said second portion of each of said pivot brackets.

6. The equipment carrier as defined in claim 5 wherein said slots are configured to open rearwardly.

7. The equipment carrier as defined in claim 1 wherein said second portion is a rearwardly extending C-shaped channel section having top, bottom and vertical walls.

8. The equipment carrier as defined in claim 7 wherein a rearwardly opening slot is located in said vertical wall, and said top and bottom walls are provided with axially aligned openings.

9. The equipment carrier as defined in claim 8 wherein said means for retaining said pivot means relative to said pivot bracket portion include a keeper pin adapted to be inserted through said openings in said channel section once said pivot means has been secured in said slot.

10. The equipment carrier as defined in claim 9 wherein said pivot means is a pivot pin secured to each side edge of said rear wall so as to project laterally therefrom.

11. The equipment carrier as defined in claim 1 wherein said rear wall is provided with a vertical support bracket along each side edge thereof.

12. The equipment carrier as defined in claim 11 wherein said pivot means is a large-headed pivot pin secured to each of said support members so as to project laterally outward therefrom.

13. The equipment carrier as defined in claim 1 wherein said rear wall is fabricated of expanded metal.

14. The equipment carrier as defined in claim 1 wherein said floor is fabricated of expanded metal.

15. An equipment carrier for a vehicle having a dump box with a tailgate framed by a pair of vertical stake pockets, comprising:
    a carrier portion having a generally L-shaped cross section with a vertical back wall joined to a horizontal floor, said back wall and said floor each having corresponding side edge margins, and a pair of vertical support members, each of which having an upper end and a lower end being secured to each of said side margins of said back wall, the upper end of each of said vertical supports having a laterally projecting pivot pin secured thereto; and
    a pivot bracket portion having a pair of pivot brackets, each said bracket having a vertically depending leg portion adapted to be inserted into one of said stake pockets, a rearwardly extending portion having an elongate, rear-opening slot adapted to accommodate one of said pivot pins of said carrier for pivoting movement therein, and a keeper pin for retaining said each of said pivot pins in said slot.

* * * * *